United States Patent
Foehr et al.

(10) Patent No.: US 7,440,132 B2
(45) Date of Patent: Oct. 21, 2008

(54) SYSTEMS AND METHODS FOR HANDLING A FILE WITH COMPLEX ELEMENTS

(75) Inventors: Oliver Foehr, Mercer Island, WA (US); Khaled S. Sedky, Sammamish, WA (US); Harvinder Pal Singh, Bellevue, WA (US); Feng Yue, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 10/912,795

(22) Filed: Aug. 6, 2004

(65) Prior Publication Data

US 2005/0243345 A1 Nov. 3, 2005

Related U.S. Application Data

(60) Provisional application No. 60/567,663, filed on May 3, 2004.

(51) Int. Cl.
*G06F 15/00* (2006.01)
*G06K 1/00* (2006.01)
*G06K 15/00* (2006.01)

(52) U.S. Cl. .................................. 358/1.18; 358/1.11

(58) Field of Classification Search .............. 358/1.9, 358/1.1, 1.13, 453, 461, 462, 463, 464, 1.18, 358/1.14, 1.11
See application file for complete search history.

(56) References Cited

U.S. PATENT DOCUMENTS

| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,222,205 A | 6/1993 | Larson et al. |
| 5,469,533 A | 11/1995 | Dennis |
| 5,487,138 A | 1/1996 | Rust et al. |
| 5,537,526 A | 7/1996 | Anderson et al. |
| 5,613,124 A | 3/1997 | Atkinson et al. |
| 5,745,910 A | 4/1998 | Piersol et al. |
| 5,752,055 A | 5/1998 | Redpath et al. |
| 5,752,056 A | 5/1998 | Celik |
| 5,806,078 A | 9/1998 | Hug et al. |
| 5,819,295 A | 10/1998 | Nakagawa et al. |
| 5,845,058 A | 12/1998 | Shaw et al. |
| 5,903,903 A | 5/1999 | Kennedy |
| 5,905,504 A | 5/1999 | Barkans et al. |
| 5,911,138 A | 6/1999 | Li et al. |
| 5,920,684 A | 7/1999 | Hastings et al. |

(Continued)

OTHER PUBLICATIONS

El-kwae, et al., "Document Image Representation Using XML Technologies"; Proceedings of SPIE, vol. 4670, 2001, pp. 109-120.

(Continued)

*Primary Examiner*—Douglas Q Tran
(74) *Attorney, Agent, or Firm*—Lee & Hayes, PLLC

(57) ABSTRACT

The described systems and methods are directed at converting a file with complex elements so that a legacy utilization device, such as a legacy printer, can properly process the file. The described systems may include a converter module with a modular filter pipeline. The converter module may identify elements with complex features in a file. Simpler features that approximate the complex features are determined. The identified elements in the file may be replaced with elements having the simpler features.

36 Claims, 12 Drawing Sheets

U.S. PATENT DOCUMENTS

| | | |
|---|---|---|
| 5,950,215 A | 9/1999 | Tabuchi |
| 5,960,168 A | 9/1999 | Shaw et al. |
| 5,993,088 A | 11/1999 | Nogay et al. |
| 6,026,416 A | 2/2000 | Kanerva et al. |
| 6,070,175 A | 5/2000 | Mezei |
| 6,094,665 A | 7/2000 | Lyons et al. |
| 6,134,552 A | 10/2000 | Fritz et al. |
| 6,144,974 A | 11/2000 | Gartland |
| 6,182,080 B1 | 1/2001 | Clements |
| 6,182,096 B1 | 1/2001 | Mastie et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders et al. |
| 6,362,870 B2 | 3/2002 | Mui et al. |
| 6,407,821 B1 | 6/2002 | Hohensee et al. |
| 6,418,448 B1 | 7/2002 | Sarkar |
| 6,449,653 B2 | 9/2002 | Klemets et al. |
| 6,457,017 B2 | 9/2002 | Watkins et al. |
| 6,480,206 B2 | 11/2002 | Prinzing |
| 6,507,858 B1 | 1/2003 | Kanerva et al. |
| 6,538,760 B1 | 3/2003 | deBry et al. |
| 6,549,918 B1 | 4/2003 | Probert, Jr. et al. |
| 6,583,789 B1 | 6/2003 | Carlson et al. |
| 6,591,278 B1 | 7/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,789,229 B1 | 9/2004 | Dunietz et al. |
| 6,812,941 B1 | 11/2004 | Brown et al. |
| 6,910,843 B2 | 6/2005 | Saw et al. |
| 6,925,597 B2 | 8/2005 | Anwar |
| 6,944,515 B2 | 9/2005 | Nakajima et al. |
| 6,952,801 B2 | 10/2005 | Warmus et al. |
| 7,043,688 B1 | 5/2006 | Tsutsumi et al. |
| 7,047,237 B2 | 5/2006 | Suzuki et al. |
| 7,051,276 B2 | 5/2006 | Mogilevsky et al. |
| 7,162,538 B1 | 1/2007 | Cordova |
| 7,271,935 B2 * | 9/2007 | Coons et al. ............... 358/2.1 |
| 7,274,483 B2 * | 9/2007 | Aiyama et al. ............ 358/1.15 |
| 2001/0003828 A1 | 6/2001 | Peterson et al. |
| 2001/0013043 A1 | 8/2001 | Wagner |
| 2001/0018697 A1 | 8/2001 | Kunitake et al. |
| 2001/0044809 A1 | 11/2001 | Parasnis et al. |
| 2002/0049790 A1 | 4/2002 | Ricker et al. |
| 2002/0065848 A1 | 5/2002 | Walker et al. |
| 2002/0073236 A1 | 6/2002 | Helgeson et al. |
| 2002/0087602 A1 | 7/2002 | Masuda et al. |
| 2002/0099797 A1 | 7/2002 | Merrell et al. |
| 2002/0111133 A1 | 8/2002 | Wittkotter |
| 2002/0174145 A1 | 11/2002 | Duga et al. |
| 2002/0188638 A1 | 12/2002 | Hamscher |
| 2003/0009672 A1 | 1/2003 | Goodman |
| 2003/0018694 A1 | 1/2003 | Chen et al. |
| 2003/0028560 A1 | 2/2003 | Kudrolli et al. |
| 2003/0050932 A1 | 3/2003 | Pace et al. |
| 2003/0079181 A1 | 4/2003 | Schumacher et al. |
| 2003/0093520 A1 | 5/2003 | Beesley |
| 2003/0126136 A1 | 7/2003 | Omoigui |
| 2003/0137539 A1 | 7/2003 | Dees |
| 2003/0149934 A1 | 8/2003 | Worden |
| 2003/0158851 A1 | 8/2003 | Britton et al. |
| 2003/0163552 A1 | 8/2003 | Savitzky et al. |
| 2003/0172168 A1 | 9/2003 | Mak et al. |
| 2003/0182152 A1 | 9/2003 | Nakajima et al. |
| 2003/0182311 A1 | 9/2003 | Nakajima et al. |
| 2003/0182450 A1 | 9/2003 | Ong et al. |
| 2003/0182656 A1 | 9/2003 | Leathers et al. |
| 2003/0187534 A1 | 10/2003 | Suzuki et al. |
| 2003/0187870 A1 | 10/2003 | Nakajima et al. |
| 2003/0195784 A1 | 10/2003 | Smith |
| 2003/0229845 A1 | 12/2003 | Salesin et al. |
| 2003/0233420 A1 | 12/2003 | Stark et al. |
| 2004/0003388 A1 | 1/2004 | Jacquemot et al. |
| 2004/0003448 A1 | 1/2004 | Morrow et al. |
| 2004/0034848 A1 | 2/2004 | Moore et al. |
| 2004/0049737 A1 | 3/2004 | Simon Hunt et al. |
| 2004/0054669 A1 | 3/2004 | Seyrat et al. |
| 2004/0061729 A1 | 4/2004 | Green et al. |
| 2004/0066527 A1 | 4/2004 | Kloosterman et al. |
| 2004/0078755 A1 | 4/2004 | Shinjo et al. |
| 2004/0103073 A1 | 5/2004 | Blake et al. |
| 2004/0117733 A1 | 6/2004 | Moreau et al. |
| 2004/0139049 A1 | 7/2004 | Hancock et al. |
| 2004/0153467 A1 | 8/2004 | Conover et al. |
| 2004/0160613 A1 | 8/2004 | Kurotsu et al. |
| 2004/0183837 A1 | 9/2004 | Watanabe et al. |
| 2004/0194025 A1 | 9/2004 | Hubert et al. |
| 2004/0205623 A1 | 10/2004 | Weil et al. |
| 2004/0205653 A1 | 10/2004 | Hadfield et al. |
| 2004/0216048 A1 | 10/2004 | Brown et al. |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0071385 A1 | 3/2005 | Rao |
| 2005/0091574 A1 | 4/2005 | Maaniitty et al. |
| 2005/0099398 A1 | 5/2005 | Garside et al. |
| 2005/0125720 A1 | 6/2005 | Little et al. |
| 2005/0132279 A1 | 6/2005 | Relyea et al. |
| 2005/0144556 A1 | 6/2005 | Petersen et al. |
| 2005/0210026 A1 | 9/2005 | Wood |
| 2005/0223312 A1 | 10/2005 | Erdtmann et al. |
| 2005/0251742 A1 | 11/2005 | Mogilevsky et al. |
| 2005/0278616 A1 | 12/2005 | Eller |
| 2005/0278626 A1 | 12/2005 | Malik |
| 2006/0031749 A1 | 2/2006 | Schramm et al. |
| 2006/0041838 A1 | 2/2006 | Khan |
| 2006/0047743 A1 | 3/2006 | Yuan et al. |
| 2006/0056334 A1 | 3/2006 | Yuan et al. |
| 2006/0080316 A1 | 4/2006 | Gilmore et al. |
| 2006/0117019 A1 | 6/2006 | Sylthe et al. |
| 2006/0136827 A1 | 6/2006 | Villaron et al. |
| 2006/0155529 A1 | 7/2006 | Ludviksson et al. |
| 2006/0206794 A1 | 9/2006 | Ornstein et al. |

OTHER PUBLICATIONS

Christodoulakis, et al., "Multimedia Document Presentation, Information Extraction, and Document Formation in MINOS: A Model and a System"; ACM Transaction on Office Information Systems, vol. 4, No. 4: Oct. 1986; pp. 345-383.

"SVG Print", W3C Working Draft, Jul. 15, 2003 http://www.w3.org/TR/2003/WD-SVGPrint-20030715/ pp. 1-14.

"Open eBook Publication Structure 1.2", Aug. 27, 2002, 91 pages.

"Networked File System"; http://www.scit.wlv.ac.uk/~jphb/comms/nfs.html.; 6 pages.

"Apache Server Frequently Asked Questions"; Apache HTTP Server Version 1.3; http://httpd.apache.org/docs/misc/FAQ.html.; 35 pages.

"URIQA! The URI Query Agent Model, A Semantic Web Enabler"; URIQA: The Nokia Query Agent; http://sw.nokia.com/uriqa/URIQA.html.; 9 pages 2004.

"XMP Adding Intelligence to Media"; XMP Specification, Jan. 2004, 11 pages.

"Controlling the Data Chaos by Adding Intelligence to Media"; 4 pages. 2004.

"SOAP Version 1.2 Part 1: Messaging Framework"; W3C Proposed Recommendation May 7, 2003; http://www.w3.org/TR/2003/PR-soap12-part1-20030507. 25 pages.

"Interleaved Graphics and Text" Bluethman et al., IBM Technical Disclosure Bulletin, Apr. 1980, vol. 22, No. 11., pp. 4813-4815.

Efficient Representation and Streaming of XML Content Over the Internet Medium Girardot et al., IEEE 2000 pp. 67-70.

Miller; "An Introduction to the Resource Description Framework"; D-Lib Magazine, May 1998; ISSN 1082-9873; http://www.dlib.org/dlib/may98/miller/05miller.html. 10 pages.

"@tryinCSS3 (was Useragent Rules in CSS)"; Mar. 31, 2004; http://lists.w3.org/Archives/Public/www-style/2004Mar/0333.html.; 2 pages.

"[Editorial Draft] Versioning XML Languages"; Proposed TAG Finding Nov. 16, 2003; http://www.w3.org/2001/tag/doc/versioning-20031116; 23 pages.

Official Notice Of Rejection for China Patent Application No. 200480001329.4 mailed on Nov. 23, 2007, pp. 16.

Holman; "What is XSL-FO", Google Mar. 20, 2002, pp. 1-4.

Pawson; "Printing from XML: An Introduction to XSL-FO", Google Oct. 9, 2002, pp. 1-4.

Marco, et al., "A Framework for Designing and Implementing the Ada Standard Container Library", ACM 2003, pp. 49-61.

Orchard, "Versioning XML Vocabularies", published on XML.com, Dec. 3, 2003, pp. 1-10.

Orchard et al [Editiorial Draft] Versioning XML Languages W3C Proposed TAG finding. Nov. 16, 2003, pp. 1-23.

Chien, et al., "Effcient Schemes for Managing Multiversion XML Documents", University of California, California, Dec. 19, 2002, pp. 332-353.

Han, et al., "WebSplitter:A Unified XML Framework for Multi-Device Collaborative web browsing" IBM Thomas J. Watson research Centre, Hawthorne, CSCW, Dec. 2-6, 2000, ACM 1-58113-222-0/00/0012, pp. 221-230.

Hardy, et al., "Mapping and Displaying Structural Transformations between XML and PDF", ACM, 2002, pp. 95-102.

Jacobs et al.; "Adaptive Grid-Based Document Layout"; 2003 ACM; pp. 838-847.

Peters et al., "CrystalWeb—A distributed authoring environment for the World-Wide Web" Computer Networks and ISDN Systems, North Holland Publishing. Amsterdam, NL. vol. 27, No. 6, Apr. 1995, pp. 861-870.

Ellis et al:, "Postscrip, Bezier Curves and Chinese Character", ACM, 1989, pp. 162-165.

* cited by examiner

SYSTEMS AND METHODS FOR HANDLING A FILE WITH COMPLEX ELEMENTS

CLAIM OF PRIORITY

This application claims the benefit of U.S. Provisional Application No. 60/567,663, filed May 3, 2004.

TECHNICAL FIELD

The systems and methods discussed herein relate to electronic file handling and printing.

BACKGROUND OF THE INVENTION

Elements in files that are generated by advanced application programs are becoming increasingly complex. To properly print files with these complex elements, printers have to be specially configured to accurately and efficiently process the elements. Printers that are not made with such configuration are often referred to as legacy printers. Legacy printers are typically incapable of printing files with complex elements without reconfiguration and extensive processing to convert the file to a bitmap format.

Thus, there is a need for an efficient and effective method to enable a legacy printer to process files with complex elements.

SUMMARY OF THE INVENTION

The systems and methods discussed herein convert a file with complex elements so that a legacy utilization device, such as a legacy printer, can properly process the file. The described systems may include a converter module with a modular filter pipeline. The converter module may identify elements with complex features in a file. Simpler features that approximate the complex features are determined. The identified elements in the file may be replaced with elements having the simpler features.

DETAILED DESCRIPTION

Figure 1:
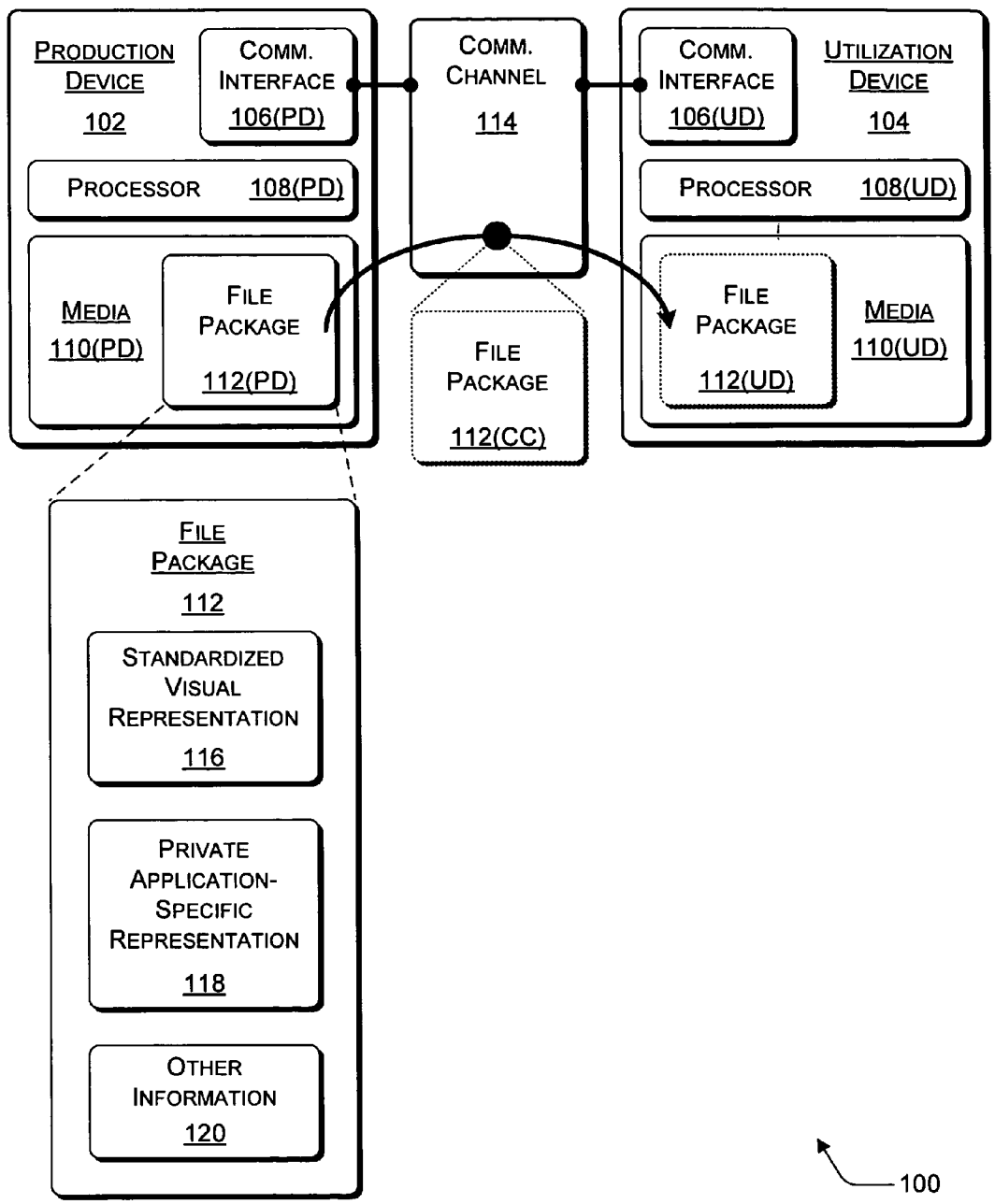
FIG. 1 is an example of a block diagram illustrating a production device and a utilization device with respect to a file package.

FIG. 1 is an example of a block diagram 100 illustrating a production device 102 and a utilization device 104 with respect to a file package 112. Production device 102 is capable of producing file package 112. Production device 102 is adapted to provide file package 112 to utilization device 104 over a communication channel 114 for utilization by utilization device 104.

As illustrated, each of production device 102 and utilization device 104 include one or more processors 108, at least one media 110, and a communication interface 106 that is coupled to communication channel 114. Specifically, production device 102 includes a processor 108(PD), media 110 (PD), and a communication interface 106(PD). Similarly, utilization device 104 includes a processor 108(UD), media 110(UD), and a communication interface 106(UD).

Media 110 typically includes processor-executable instructions that are executable by processor 108 to effectuate functions of devices 102 and 104. Media 110 may be realized as storage or transmission media, volatile or non-volatile media, removable or non-removable media, some combination thereof, and so forth. For example, media 110 may be realized as (i) a volatile random access memory (RAM), (ii) a non-volatile disk-based memory, (iii) a transmission medium, and/or (iv) a propagating signal. Communication channel 114 may be comprised of one or more wireless or wired links that directly interconnect communication interfaces 106 or that indirectly interconnect them across one or more networks (not explicitly shown). Additional details and examples of devices, processors, media, communication mechanisms, and so forth are described further below with reference to FIG. 12.

In a described implementation, file package 112 includes a standardized visual representation 116, a private application-specific representation 118, and other information 120. Standardized visual representation 116 and private application-specific representation 118 can exist in parallel within a single file package 112. Standardized visual representation 116 includes data that enables display of the content in a platform independent manner using, for example, a platform-independent application viewer (not shown in FIG. 1). Private application-specific representation 118 includes data that enables display (and manipulation) of the content using, for example, a proprietary internal format. When the various parts of file package 112 are bundled into a single file, such a single file may be considered a container.

Although shown separately as discrete units, standardized visual representation 116 and private application-specific representation 118 may actually be at least partially overlapping and interrelated. In other words, they may share content information and/or formatting data. Other information 120 represents any additional information and/or metadata included in file package 112 that may be useful for or related to authorship information, version/change tracking, routing information, other visual or non-visual representations, printing information, and so forth.

As illustrated, production device 102 produces file package 112(PD). Production device 102 transmits file package 112 (PD) across communication channel 114 via communication interface 106(PD). File package 112(CC) propagates along communication channel 114. Utilization device 104 receives file package 112(UD) through communication channel 114 via communication interface 106(UD). Upon receipt, utilization device 104 may utilize file package 112(UD) depending on the intended use and/or capabilities of utilization device 104. For example, utilization device 104 may be capable of printing, displaying/viewing, distributing, archiving, etc. file package 112(UD). Although not so illustrated, an application (e.g., a file-package-capable viewer) on production device 102 may utilize file package 112.

Figure 2:
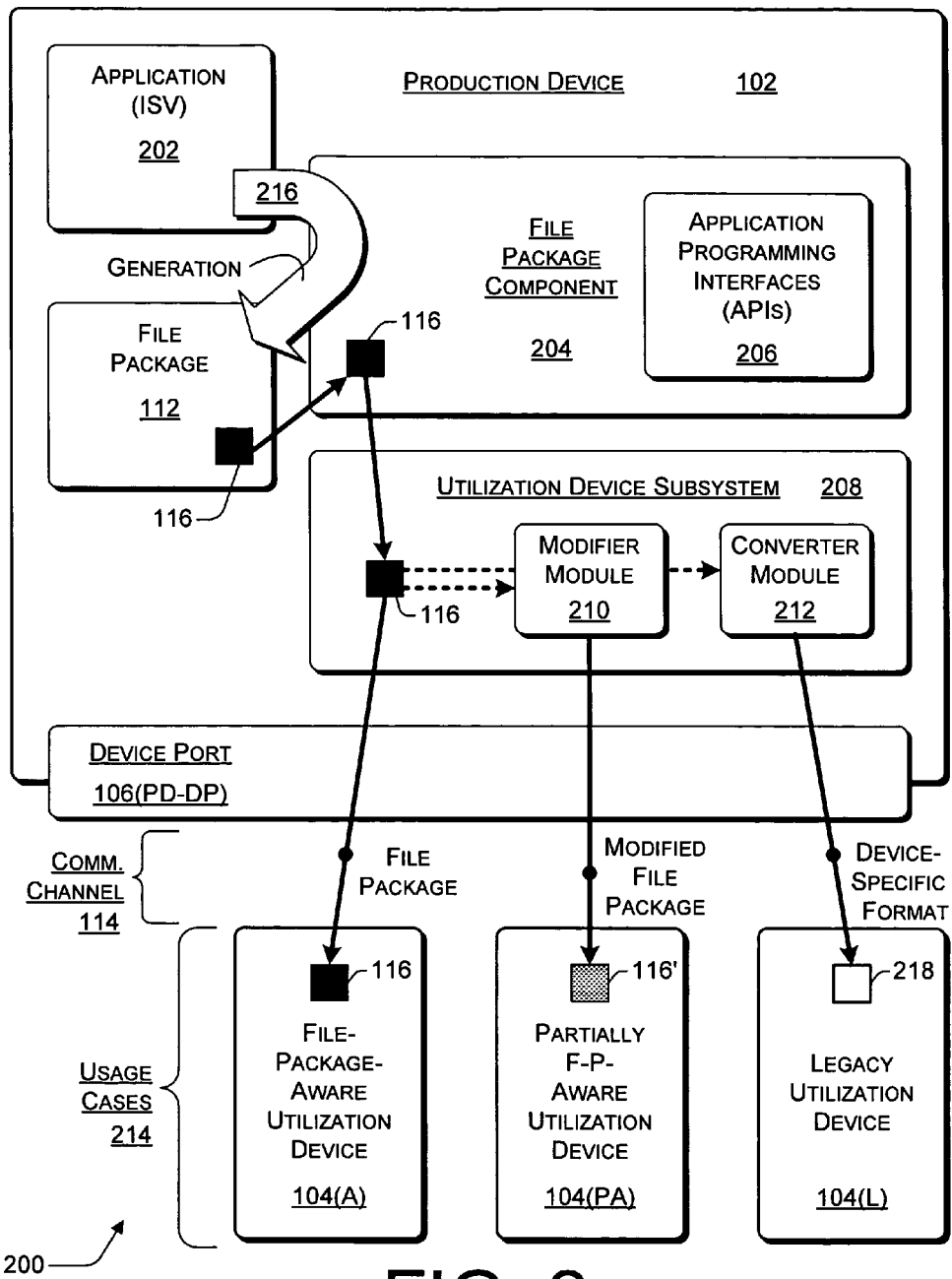
FIG. 2 is an example of a block diagram of the production device providing the file package to utilization devices under different usage cases for different types of utilization devices.

FIG. 2 is an example of a block diagram 200 of production device 102 providing file package 112 to utilization devices 104 under different usage cases 214 for different types of utilization devices 104. Examples of three different usage cases 214 are shown for three different utilization devices 104. These three utilization devices 104 are: a file-package-aware utilization device 104(A), a partially file-package-aware utilization device 104(PA), and a legacy utilization device 104(L). Although three usage cases 214 are illustrated and described, there may alternatively be more or fewer different types of utilization devices 104.

As illustrated, production device 102 includes an application 202, a file package component 204, and a utilization device subsystem 208. Production device 102 also includes a device port 106(PD-DP) implementation of a communication interface 106(PD). By way of utilization device subsystem 208, production device 102 sends file package 112, or at least a version or portion thereof, to utilization devices 104 over communication channel 114 via device port 106(PD-DP).

In a described implementation, application 202 is an application of an independent software vendor (ISV), at least with respect to file package 112, file package component 204, and related features. Consequently, application 202 generates 216 file package 112 using file package component 204. For example, application 202 may make one or more calls to application programming interfaces (APIs) 206 of file package component 204 in order to generate 216 standardized visual representation 116 of file package 112, other information 120 (of FIG. 1), and/or additional parts of file package 112. APIs 206 may alternatively be implemented fully or partially separately from file package component 204. Although not explicitly indicated in FIG. 2, application 202 may access file package 112 after generation 216 thereof.

Standardized visual representation 116 of file package 112 is represented diagrammatically as a black square 116 in block diagram 200. When file package 112 is to be provided to a utilization device 104 (e.g., as requested by application 202), file package component 204 accesses file package 112. In this example, file package component 204 extracts standardized visual representation 116 from file package 112 and forwards standardized visual representation 116 to utilization device subsystem 208. Alternatively, file package component 204 may forward other or additional parts, including all parts, of file package 112 to utilization device subsystem 208. The forwarding may also be effectuated directly by application 202 using APIs 206.

Generally, utilization device subsystem 208 is capable of handling file packages 112, or at least standardized visual representations 116. Specifically, utilization device subsystem 208 is adapted to provide at least a portion of file package 112 to a given utilization device 104 in dependence on the corresponding usage case 214. To this end, utilization device subsystem 208 includes a modifier module 210 and a converter module 212.

File-package-aware utilization device 104(A) is capable of understanding and handling file package 112 technology. In other words, file-package-aware utilization device 104(A) is capable of consuming or properly digesting file packages 112. Consequently, utilization device subsystem 208 forwards standardized visual representation 116 and additional parts, including all parts of file package 112, to file-package-aware utilization device 104(A) without changes thereto via device port 106(PD-DP) and across communication channel 114.

However, one or more changes to standardized visual representation 116 are made prior to forwarding it to partially-file-package-aware utilization device 104(PA). Partially-file-package-aware utilization device 104(PA) is capable of understanding and handling a subset of and/or non-standard file package 112 technology. Specifically, modifier module 210 modifies standardized visual representation 116 to produce a modified standardized visual representation 116'. Modifier module 210 is adapted to rearrange information of file package 112, to remove information to create a backward-compatible version of standardized visual representation 116, and so forth. This modified standardized visual representation 116' is forwarded from utilization device subsystem 208 to partially-file-package-aware utilization device 104(PA) via device port 106(PD-DP) and across communication channel 114.

On the other hand, some utilization devices 104 can neither understand nor otherwise handle file packages 112. For example, legacy utilization device 104(L) is incompatible with file package 112. Consequently, utilization device subsystem 208 uses converter module 212 to convert standardized visual representation 116 to a device-specific format representation 218 that is compatible with legacy utilization device 104(L). Device-specific format representation 218 is forwarded from utilization device subsystem 208 to legacy utilization device 104(L) via device port 106(PD-DP) and across communication channel 114. For this usage case 214, legacy utilization device 104(L) is unaware that device-specific format representation 218 originated from part of a file package 112. In these manners, file packages 112 can be effectively utilized directly or indirectly by various utilization devices 104 of various usage cases 214.

Generally, utilization devices 104 may be displaying/viewing devices, archiving devices, distributing devices, printing devices, some combination thereof, and so forth. However, in a described implementation, utilization devices 104 are printing devices. In a printing device 104 implementation, application 202 may be a word processing program, a spreadsheet program, or a slide show program, and so forth. Additionally, utilization device subsystem 208 may be realized as a printing subsystem (e.g., a spooler), and device port 106(PD-DP) may be realized as a parallel port, a Universal Serial Bus (USB) port, or a network interface, and so forth. Accordingly, device-specific format 218 may be realized as a Postscript file, a printer control language (PCL) file, or a rasterized bit map information file, and so forth.

Figure 3:
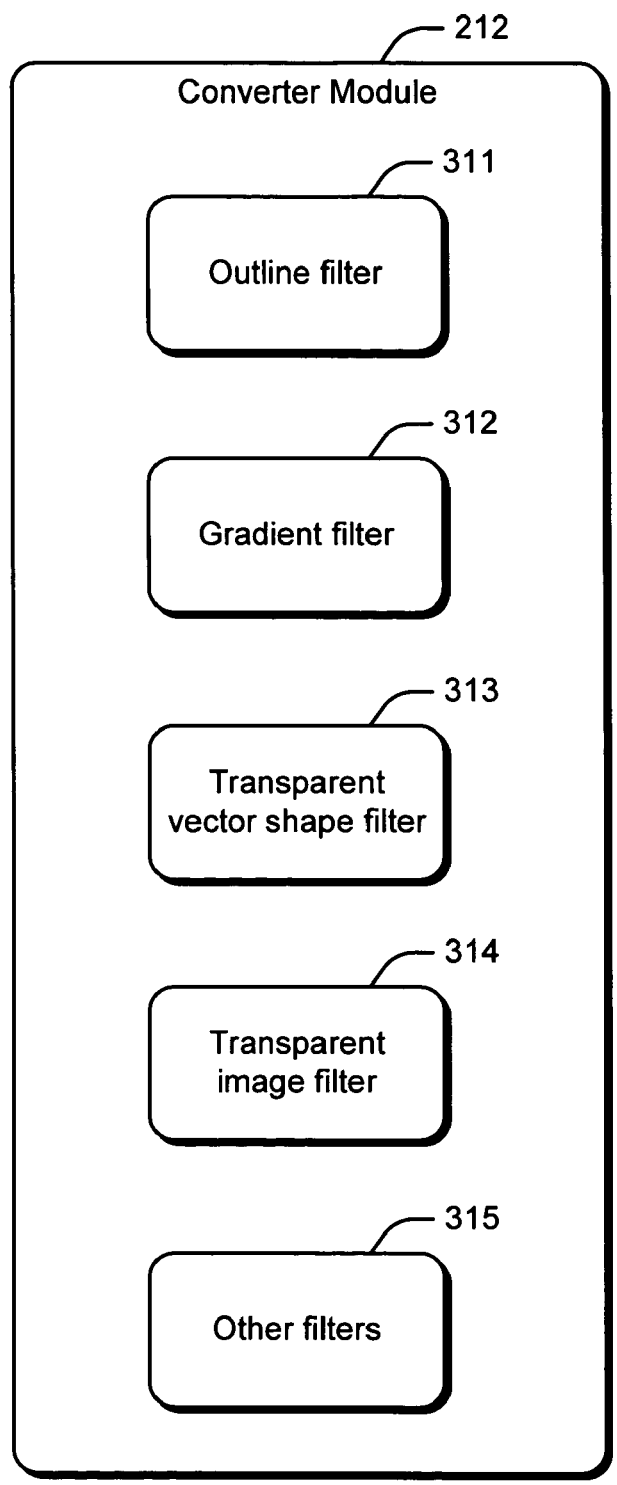
FIG. 3 illustrates example filters that may be included in a converter module shown in FIG. 2.

FIG. 3 illustrates example filters that may be included in the converter module 212 shown in FIG. 2. A file package may include complex elements that cannot be readily printable by an output device. The output device may be a legacy printer, such as legacy utilization device 104(L). Converter module 212 is configured to process the file package and send data that is usable by a legacy printer to print the file.

As shown in FIG. 3, converter module 212 includes filters 311-315, which form a filter pipeline. Each of the filters 311-315 is configured to convert complex elements in a file that cannot be effectively processed by a legacy printer to simpler elements that the printer can efficiently print. For example, outline filter 311 is configured to process elements with complex outlines. Outline filter 311 converts the complex outline of an element to simple primitives that can be handled by a legacy printer. Simple primitives may include lines, polygons, areas, vector shape elements, and the like.

Gradient filter 312 is configured to process elements with complex gradients. Gradient filter 312 converts the complex gradient into multiple polygons with fill colors that approximate the gradient.

Transparent vector shape filter 313 is configured to process vector shape elements with transparency. An element with transparency (e.g. alpha value less than one) allows another element that is overlapped by the element with transparency to be partially shown. The region of the overlapped element covered by the element with transparency typically has a color that is between the two elements. For example, if the transparency value is high (more opaque), the color of the overlapped region will be closer to the color of the element with transparency. If the transparency value is low (more transparent), the color of the overlapped region will be closer to the color of the overlapped element. Transparent vector shape filter 313 converts the transparency element and the overlapped element into two new elements with solid fill colors but without the overlapped region. Transparent vector shape filter 313 also creates another new element for the overlapping region with a solid fill color that approximates the original overlapping region.

Transparent image filter 314 is configured to process image elements with transparency. Transparent image filter 314 determines the overlapping region of image elements and creates a new image element that approximates the overlapping region using shape elements and other image elements. Transparent image filter 314 is configured to apply alpha computation and subsequent clipping to polygonal paths. It is to be appreciated that transparent vector shape filter 313 and transparent image filter 314 are separately discussed in this document for clarity reasons. In actual implementation, both filters may be combined into a single filter.

Converter module 212 may include other filters for performing other processing steps. For example, converter module 212 may include a filter to convert file data to information that a legacy printer can understand, such as page description language (PDL) command streams. Converter module 212 may also include filters that are not configured to modify file data. For example, converter module 212 may include a filter that sends a copy of the file data to an archive.

It is to be understood that filters 311-315 are modularly configured and form a filter pipeline where the output of one filter is served as the input of another filter. The modular configuration enables different filters to be easily added, modified or removed. The filter pipeline enables a file to be converted efficiently to a format understood by a legacy printer. This capability allows converter module 212 to provide a file to a legacy printer for printing without converting the complex elements in the file to computationally-intensive pixel-based elements, such as bitmap elements.

Figure 4:
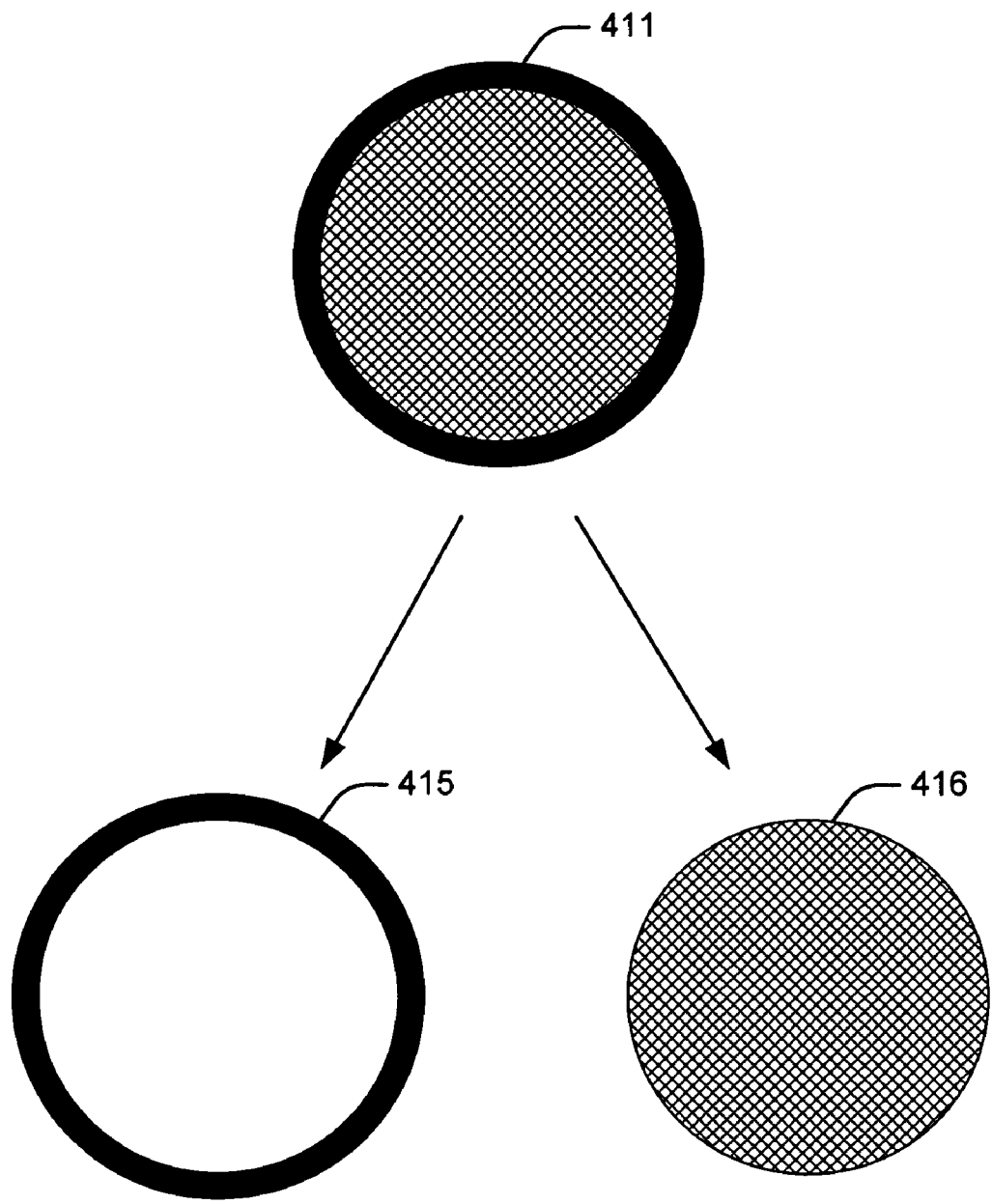
FIG. 4 shows an example conversion of an element with an outline to shape elements.

FIG. 4 shows an example conversion of an element 411 with an outline to shape elements 415-416. Element 411 is a circular shape with a fill and an outline. In this example, a legacy printer does not understand the outline attribute of element 411. Outline filter 311 is applied to convert element 411 to simpler elements 415-416. In particular, element 415 is a circular line element that approximates the outline of element 411. Element 416 is a circular shape to approximate the filled area of element 411.

It is to be appreciated that an element may include a more complex outline with complicated attributes such as irregular shapes, color, texture, and the like. Outline filter 311 is configured to handle complex outlines using the same conversion technique.

Figure 5:
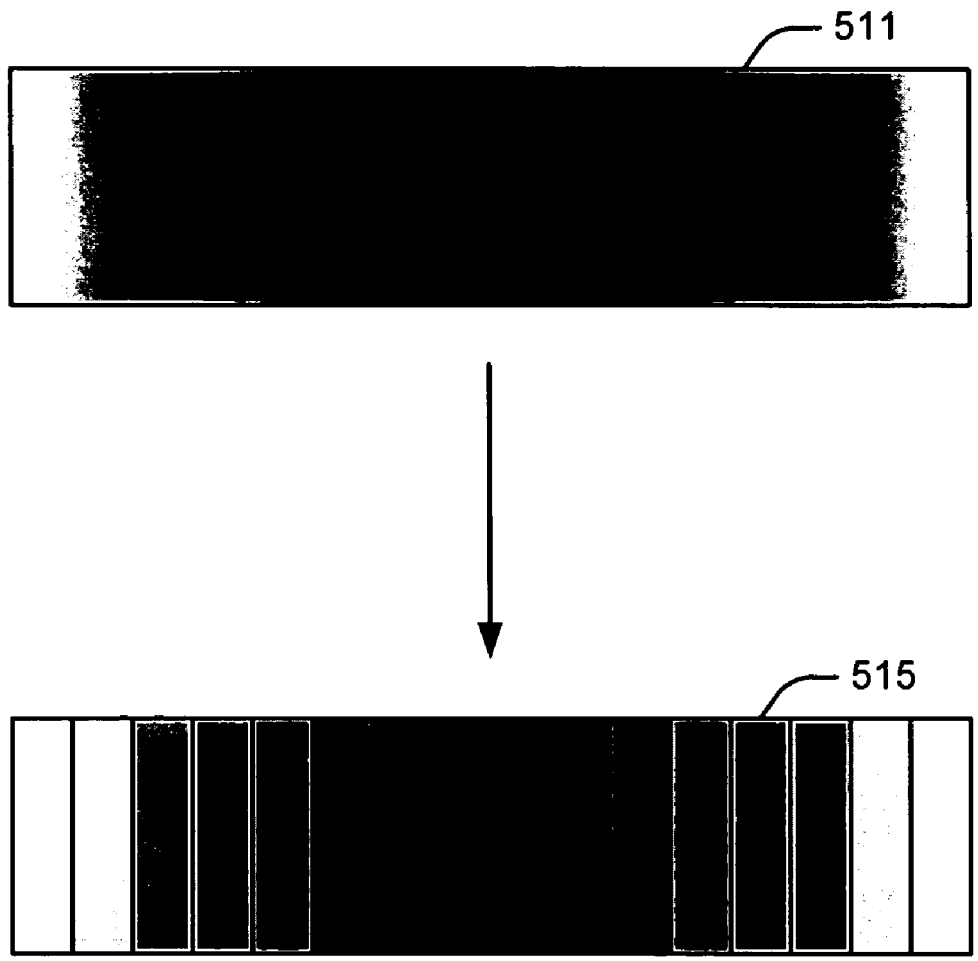
FIG. 5 shows an example conversion of an element with a gradient to shape elements.

FIG. 5 shows an example conversion of an element 511 with a gradient to shape elements 515. Element 511 includes a gradient that changes colors in two directions. In this example, a legacy printer understands solid shapes but does not understand gradients. Gradient filter 312 is applied to convert element 511 to basic shape elements 515. In this case, elements 515 are small elements that correspond to different locations in element 511 and together form the shape of element 511. Each of the elements 515 is filled with a color that approximates the color at the corresponding location in element 511. The gradient of element 511 just serves as an example for discussion purposes. Other more complex gradient may be approximate using the same conversion technique.

Figure 6:
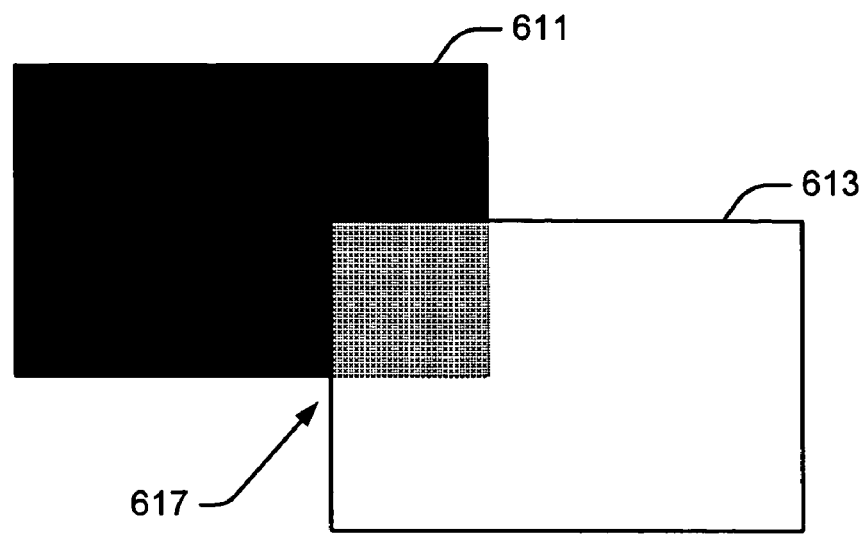
FIG. 6 shows an example conversion of overlapping elements.
Figure 6:
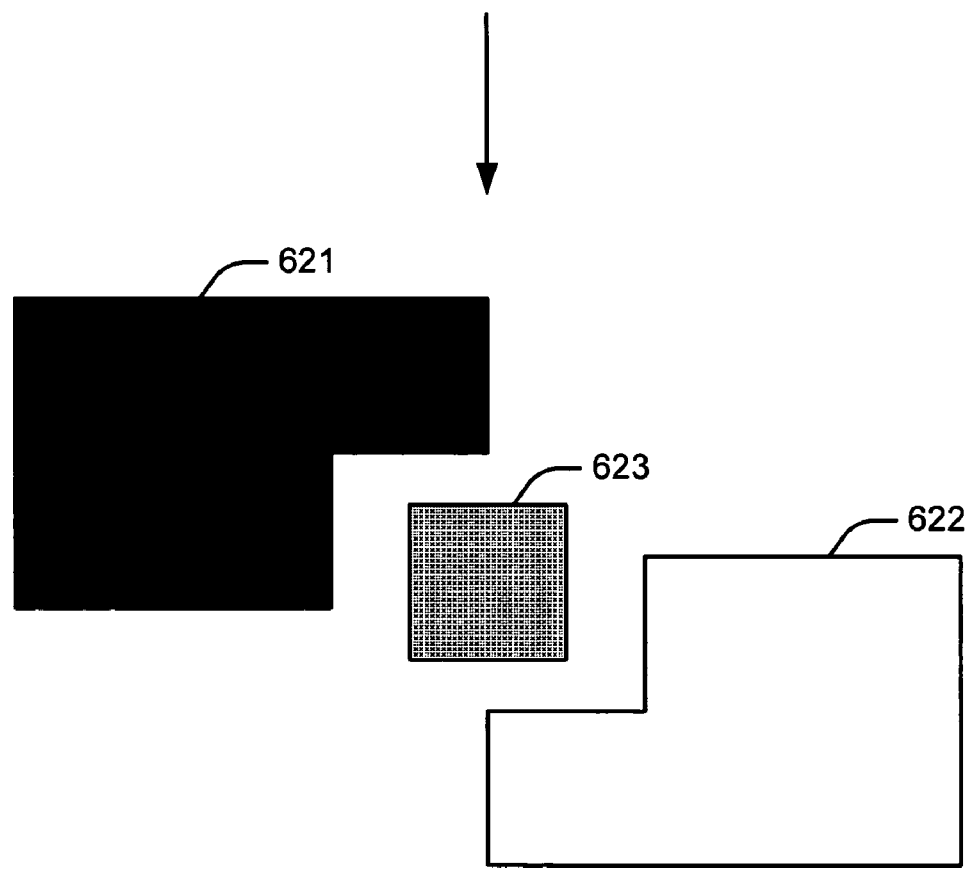

FIG. 6 shows an example conversion of overlapping elements 611 and 613. Element 613 has a transparency attribute (alpha value less than one) and overlaps element 611. An overlapped section 617 is resulted from the overlapping of the elements. The color of overlapped section 617 is between the color of element 611, which is black, and the color of element 613, which is white. In this example, a legacy printer understands solid shapes but does not understand transparency. Transparent vector shape filter 313 is applied to convert elements 611 and 613 to avoid using transparency. Elements 611 and 613 are converted to elements 621-623. Elements 621 and 622 approximate elements 611 and 613 without overlapping section 617. Element 623 approximates the shape and the color of overlapping section 617. It is to be appreciated that elements 611 and 613 may be used instead of elements 621 and 622. In this case, the overlapped section 617 is not removed from elements 611 and 613. However, the use of elements 611 and 613 in conjunction with element 623 yields the same result because element 623 is not transparent and will cover the overlapped section 617 of elements 611 and 613.

Figure 7:
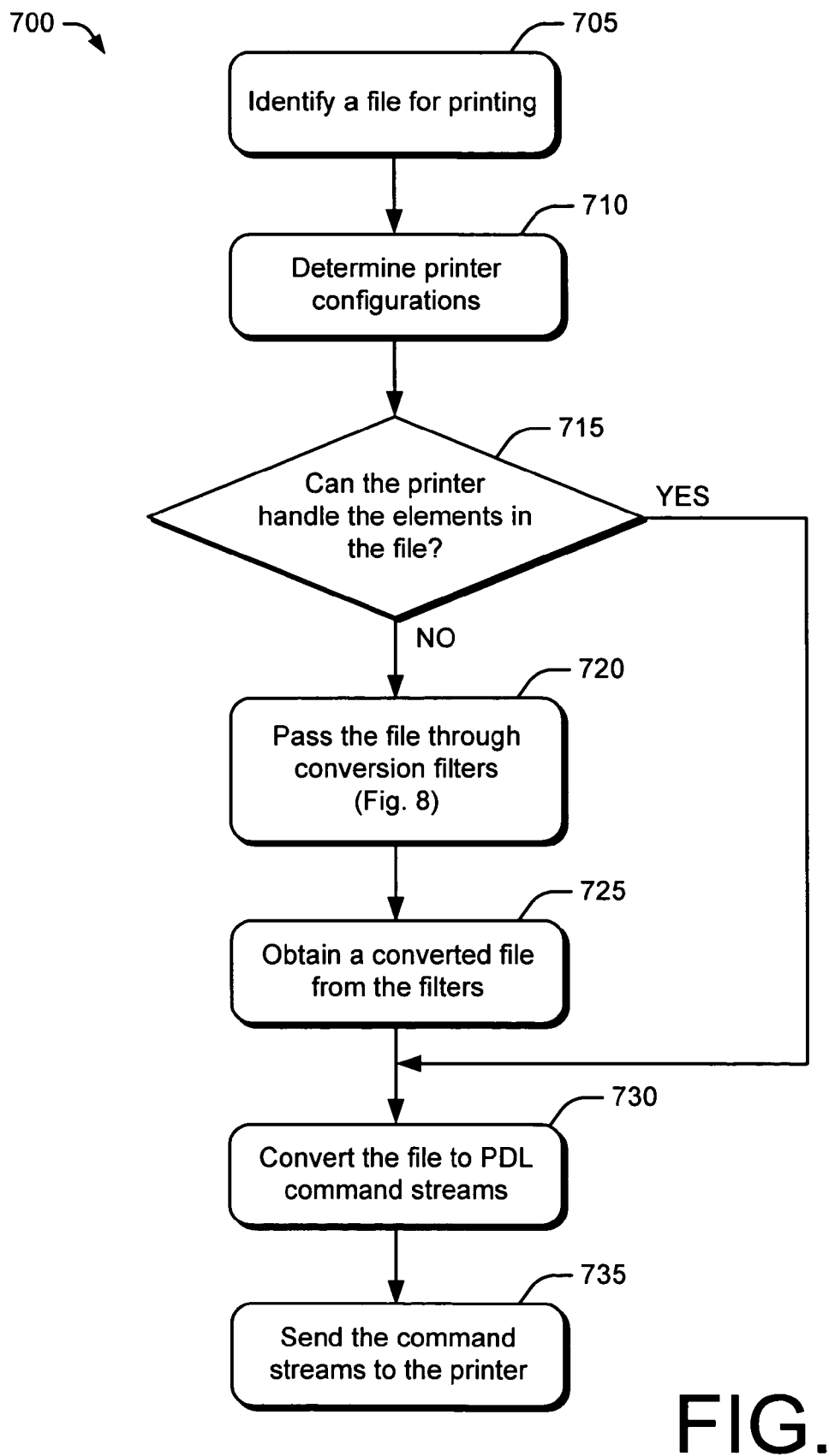
FIG. 7 shows an example process that may be used by a converter module to handle files for printing.

FIG. 7 shows an example process 700 that may be used by a converter module to handle files for printing. At block 705, a file is identified for printing. At block 710, the configuration of a printer is determined. At decision block 715, a determination is made whether the printer handles the complex elements in the file. If so, process 700 moves to block 730.

Returning to decision block 715, if the printer cannot handle the complex elements in the file, process 700 moves to block 720 where the file is passed through conversion filters. The printer may be a legacy printer that does not understand the complex elements in the file. The process of converting the file using conversion filters will be discussed in conjunction with FIG. 8. Briefly stated, the conversion filters convert complex elements in the file to simpler elements that the legacy printer can understand. At block 725, a converted file is obtained from the filters.

At block 730, the file is converted to page description language (PDL) command streams that are understood by the printer. This conversion may be performed by a filter described in block 720. At block 735, the command streams are sent to the printer.

Figure 8:
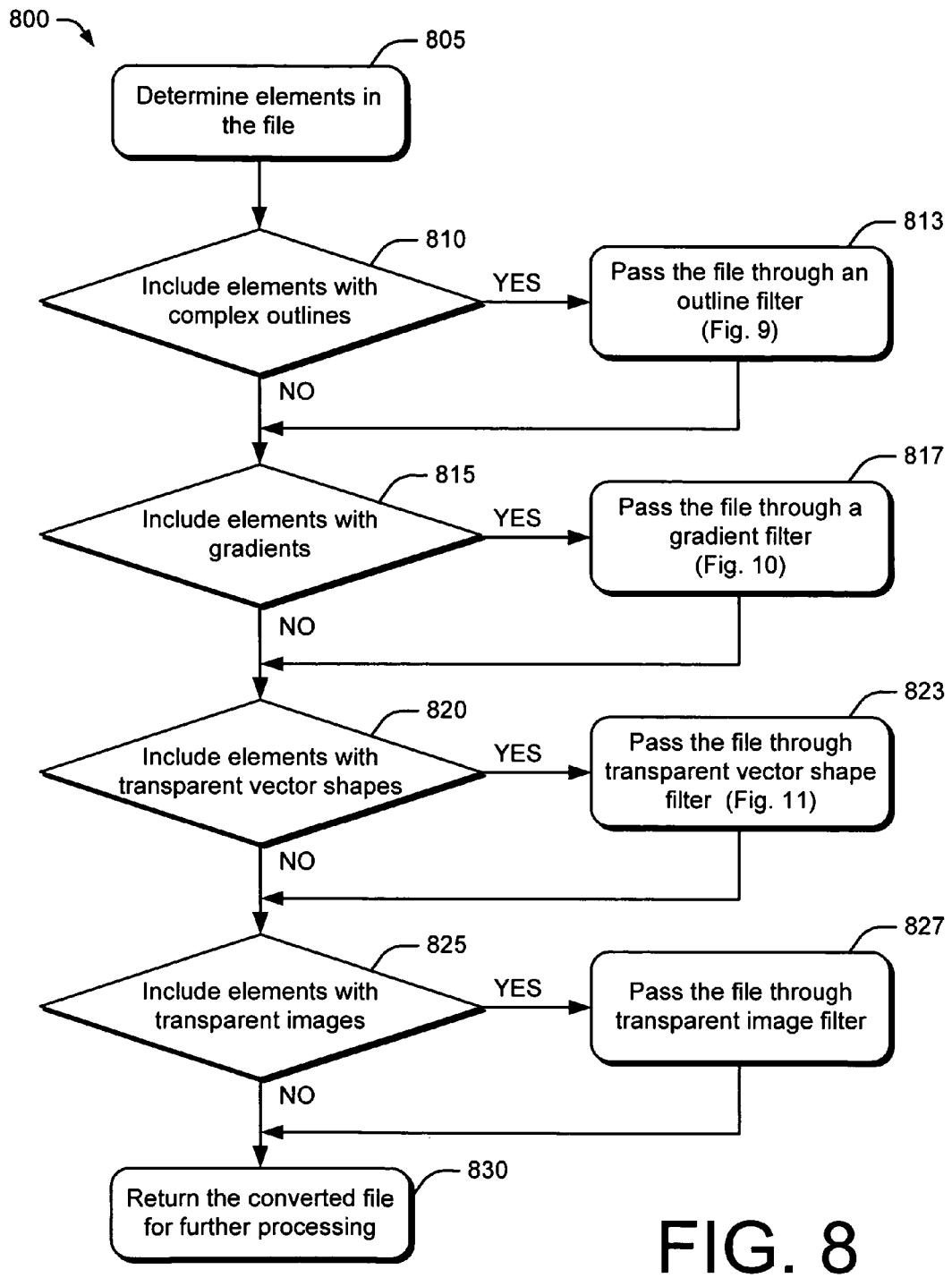
FIG. 8 shows an example process that may be used by a filter pipeline to filter files.

FIG. 8 shows an example process 800 that may be used by a filter pipeline to filter files. The files are to be printed on a legacy printer that does not understand complex outlines, gradients, and transparency. At block 805, the elements in the file are determined. At decision block 810, a determination is made whether the file includes elements with complex outlines. If so, process 800 moves to block 813 where the file is passed through an outline filter. Process 800 then moves to decision block 815. If the file does not include elements with complex outlines, process 800 also moves to decision block 815.

At decision block 815, a determination is made whether the file includes elements with gradients. If so, process 800 moves to block 817 where the file is passed through a gradient filter. Process 800 then moves to decision block 820. If the file does not include elements with gradients, process 800 also moves to decision block 820.

At decision block 820, a determination is made whether the file includes vector shapes elements with transparency. If so, process 800 moves to block 823 where the file is passed through a transparent vector shape filter. Process 800 then moves to decision block 825. If the file does not include vector shapes elements with transparency, process 800 also moves to decision block 825.

At decision block 825, a determination is made whether the file includes image elements with transparency. If so, process 800 moves to block 827 where the file is passed through a transparent image filter. Process 800 then moves to decision block 830. If the file does not include image elements with transparency, process 800 also moves to decision block 830. At block 830, the converted file is returned from the filter pipeline to the converter module for further processing.

Figure 9:
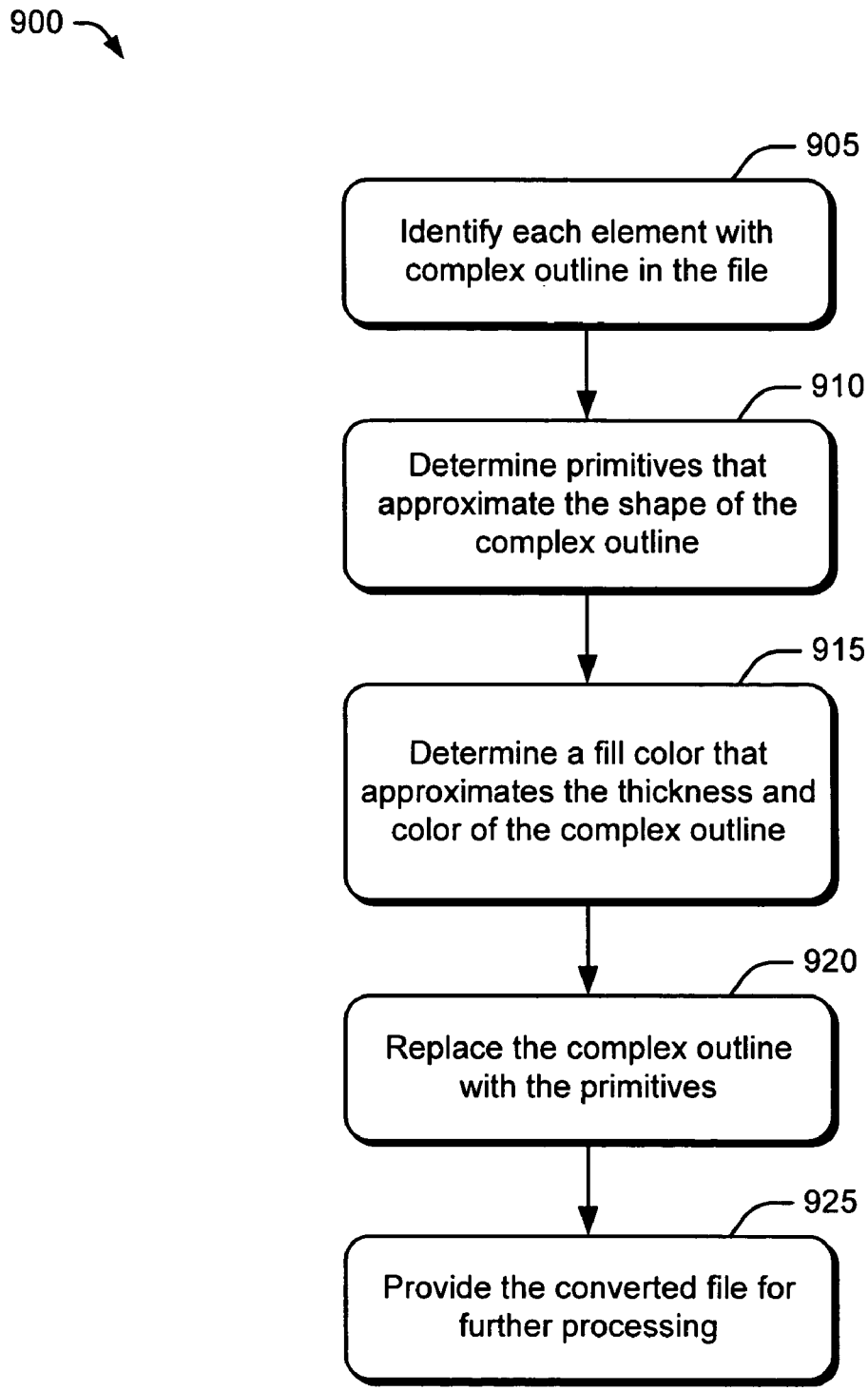
FIG. 9 shows an example process that may be used by a filter to convert a file containing elements with complex outlines.

FIG. 9 shows an example process 900 that may be used by a filter to convert a file containing elements with complex outlines. At block 905, each element with complex outline in the file is identified. At block 910, primitives that approximate the shape of the complex outline are determined. At block 915, a fill color that approximates the thickness and color of the complex outline is determined and applied if necessary. At block 920, the complex outline is replaced with the primitives. At block 925, the converted file is provided for further processing. For example, the converted file may be provided to other filters in a filter pipeline for further conversion.

Figure 10:
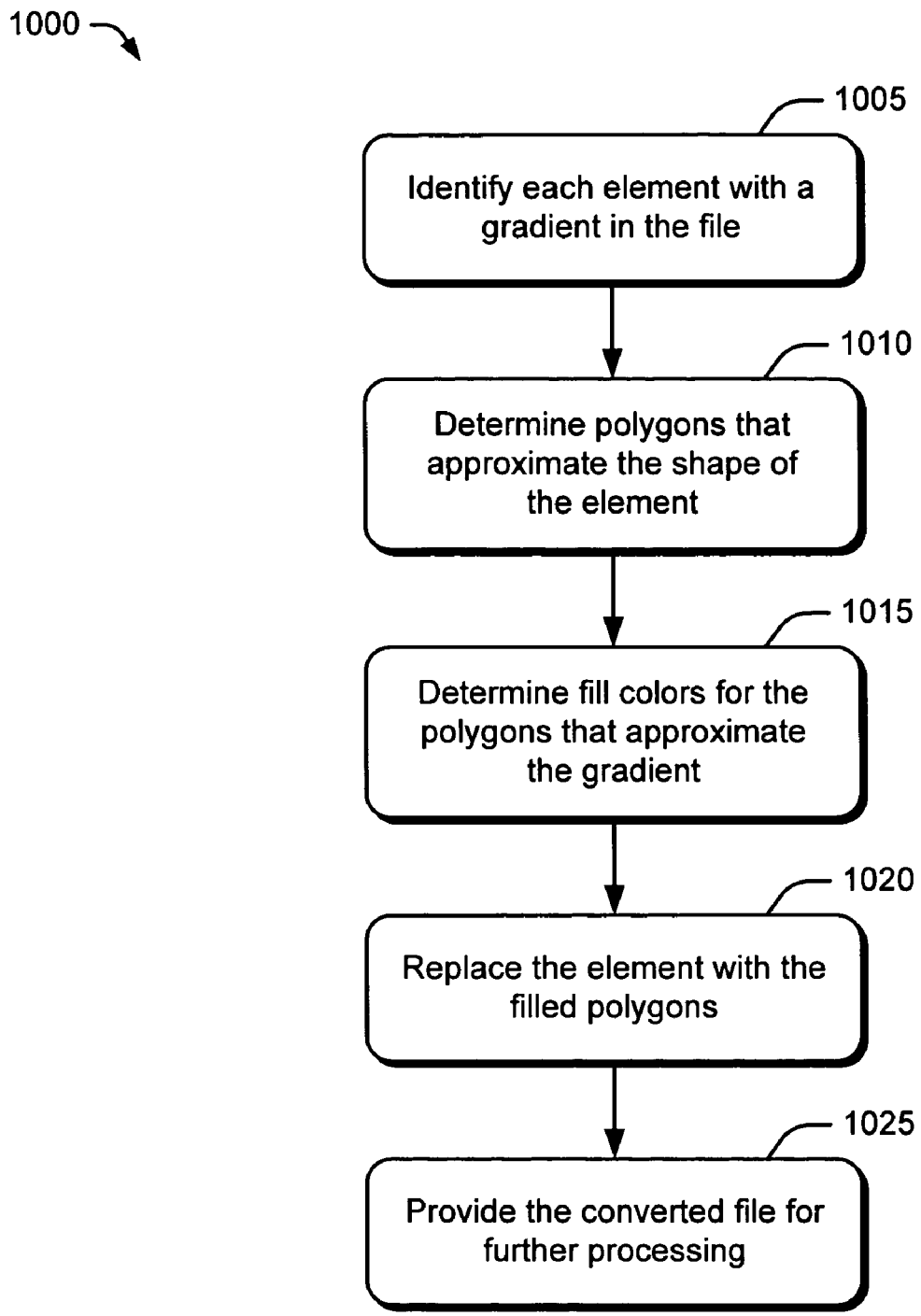
FIG. 10 shows an example process that may be used by a filter to convert a file containing elements with gradients.

FIG. 10 shows an example process 1000 that may be used by a filter to convert a file containing elements with gradients. At block 1005, each element with a gradient in the file is identified. At block 1010, polygons that approximate the shape of the element are determined. At block 1015, fill colors for the polygons that approximate the gradient are determined. At block 1020, the element is replaced with the filled polygons. At block 1025, the converted file is provided for further processing.

Figure 11:
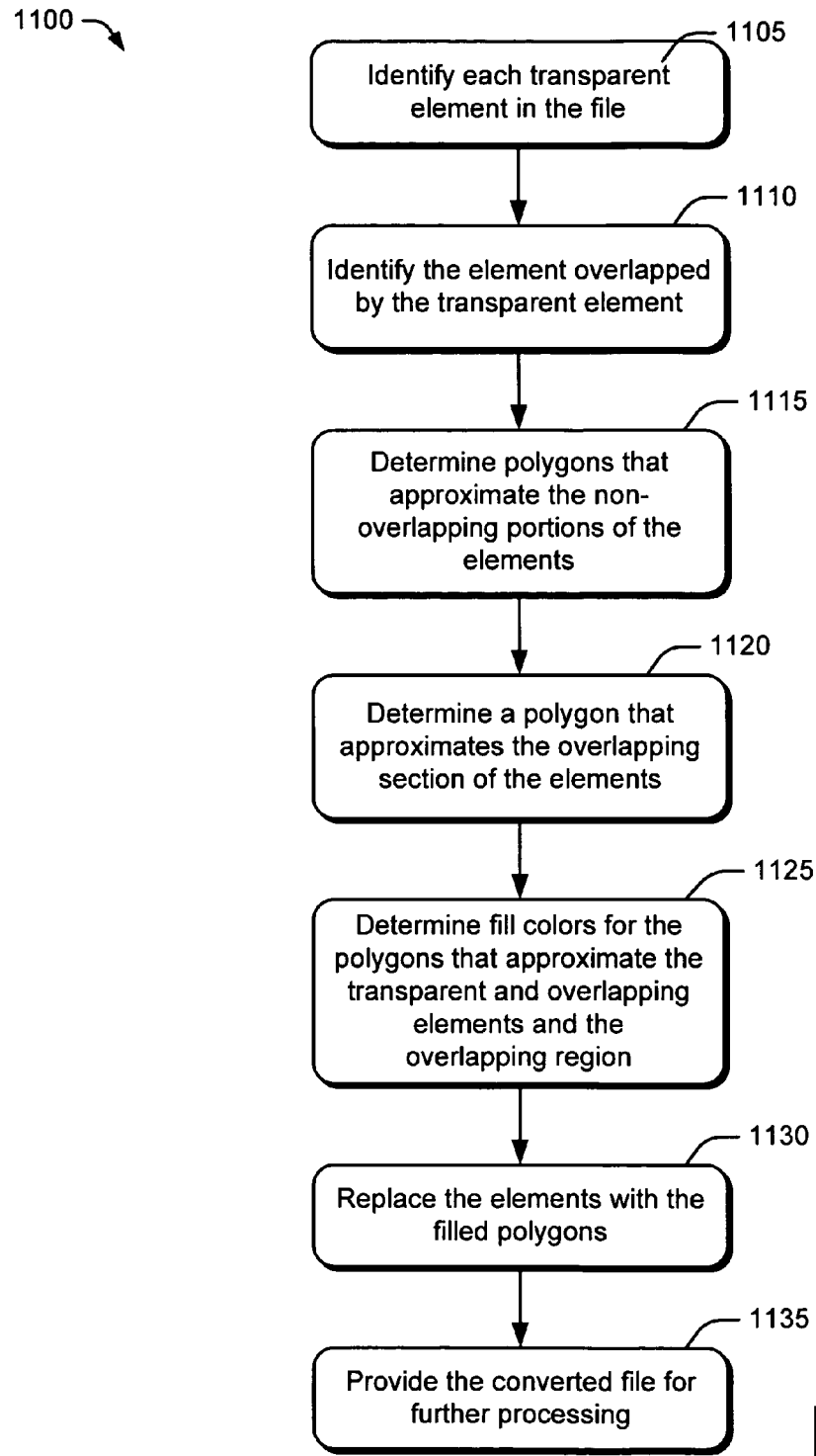
FIG. 11 shows an example process that may be used by a filter to convert a file containing elements with transparency.

FIG. 11 shows an example process 1100 that may be used by a filter to convert a file containing elements with transparency. At block 1105, each transparent element in the file is identified. At block 1110, the element overlapped by the transparent element is identified. It is to be appreciated that multiple elements may be overlapped. But for ease of discussion, only one overlapped element will be discussed in this example process.

At block 1115, polygons that approximate the non-overlapping portions of the elements are determined. At block 1120, a polygon that approximates the overlapping section of the elements is determined. At block 1125, fill colors for the polygons that approximate the transparent and the overlapping elements and the overlapping region are determined. At block 1130, the elements are replaced with the filled polygons. At block 1135, the converted file is provided for further processing.

Figure 12:
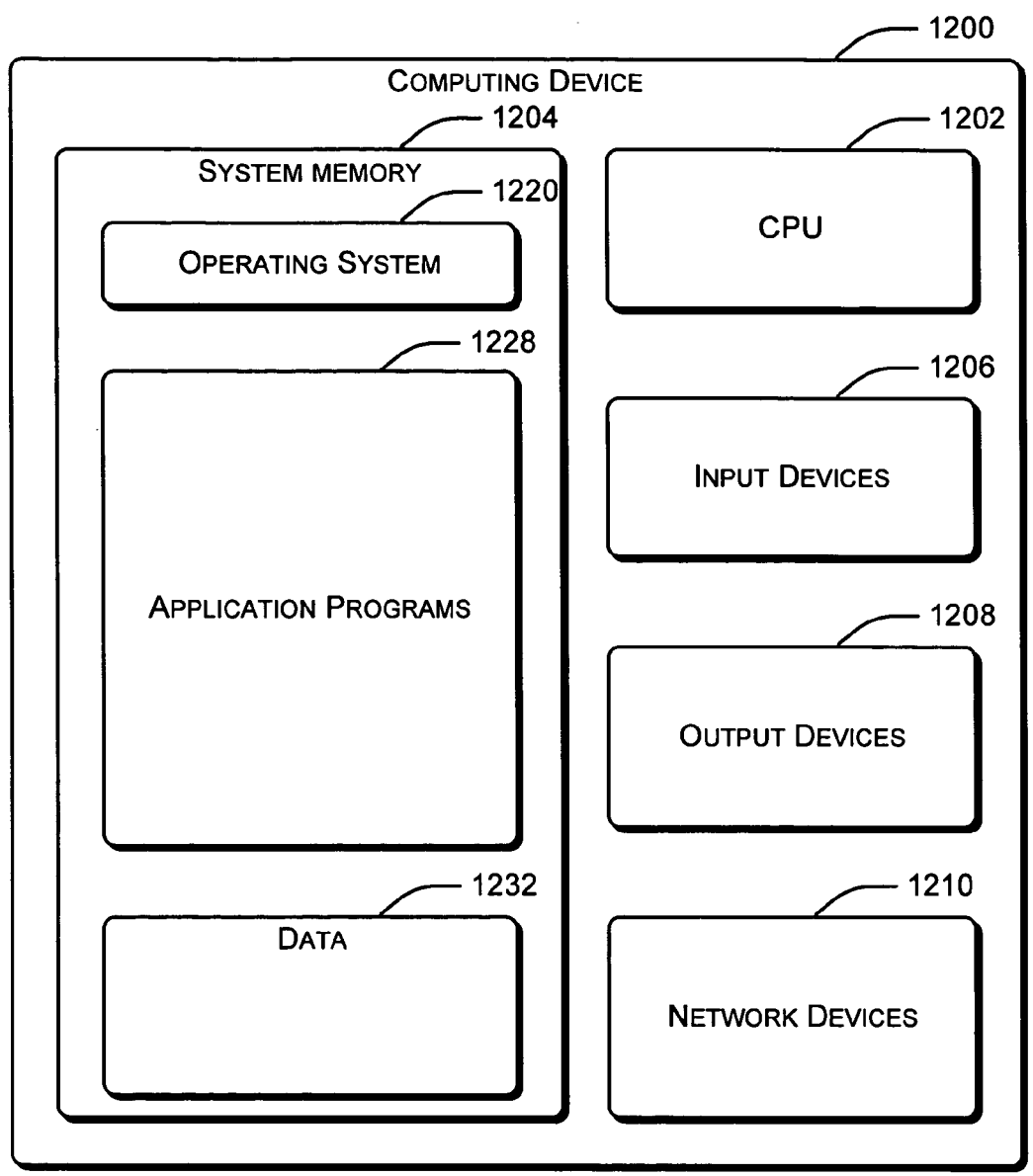
FIG. 12 illustrates an example computing device within which the described systems and methods can be either fully or partially implemented.

FIG. 12 illustrates an example computing device 1200 within which the described systems and methods can be either fully or partially implemented. Computing device 1200 is only one example of a computing system and is not intended to suggest any limitation as to the scope of the use or functionality of the invention.

Computing device 1200 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 1200 can include, but are not limited to, processors 1202 (e.g., any of microprocessors, controllers, and the like), system memory 1204, input devices 1206, output devices 1208, and network devices 1210. Output devices 1208 include any device that is capable of producing an output, such as a printer, plotter, and the like. Processors 1202 are not limited by the materials from which they are formed or the processing mechanisms employed therein. For example, processors 1202 may be comprised of semiconductor(s) and/or transistors (e.g., electronic integrated circuits (ICs)). In such a context, processor-executable instructions may be electronically-executable instructions. Alternatively, the mechanisms of or for processors 1202, and thus of or for computing device 1200, may include, but are not limited to, quantum computing, optical computing, mechanical computing (e.g., using nanotechnology), and so forth.

Computing device 1200 typically includes a variety of computer-readable media. Such media can be any available media that is accessible by computing device 1200 and includes both volatile and non-volatile media, removable and non-removable media. System memory 1204 includes computer-readable media in the form of volatile memory, such as random access memory (RAM), and/or non-volatile memory, such as read only memory (ROM). A basic input/output system (BIOS), containing the basic routines that help to transfer information between elements within computing device 1200, such as during start-up, is stored in system memory 1204. System memory 1204 typically contains data and/or program modules that are immediately accessible to and/or presently operated on by processor 1202.

System memory 1204 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 1200. It is to be appreciated that other types of computer-readable media which can store data that is accessible by computing device 1200, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 1200. Any number of program modules can be stored in system memory 1204, including by way of example, an operating system 1220, application programs 1228, and data 1232.

Computing device 1200 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 1200 via input devices 1206 such as a keyboard and a pointing device (e.g., a "mouse"). Other input devices 1206 may include a microphone, joystick, game pad, controller, satellite dish, serial port, scanner, touch screen, touch pads, key pads, and/or the like. Output devices 1208 may include a CRT monitor, LCD screen, speakers, printers, and the like.

Computing device 1200 may include network devices 1110 for connecting to computer networks, such as local area network (LAN), wide area network (WAN), and the like.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method comprising:
   identifying a complex element in a file that is not printable by an output device;
   determining simpler elements that approximate the complex element; and
   converting the complex element in the file to the simpler elements.

2. The method as recited in claim 1, further comprising:
   identifying an element with a fill area and a complex outline in the file;
   determining a first primitive that approximates the fill area;
   determining a second primitive that approximate the complex outline; and
   replacing the identified element with the primitives.

3. The method as recited in claim 1, further comprising assigning colors to the first primitive that approximates the color of the fill area.

4. The method as recited in claim 1, further comprising assigning colors to the second primitive that approximates the color of the complex outline.

5. The method as recited in claim 1, wherein the complex element includes at least one of an irregular shape, color, or texture.

6. The method as recited in claim 1, wherein the simpler elements include basic shape elements that approximate the complex elements.

7. The method as recited in claim 1, further comprising:
   identifying an element with a gradient in the file;
   determining polygons that approximate the shape of the element; and
   replacing the identified element with the polygons.

8. The method as recited in claim 7, further comprising assigning fill colors to the polygons that approximate the gradient.

9. The method as recited in claim 7, wherein the fill color for each polygon approximates the color of the element at the location corresponding to the polygon.

10. The method as recited in claim 7, wherein the gradient changes colors in at least two directions.

11. The method as recited in claim 1, further comprising:
    identifying an element with transparency in the file;
    identifying another element overlapped by the element with transparency;
    determining polygons that approximate the shape of a non-overlapping portions of the elements;
    determining a polygon that approximate the shape of an overlapping portion of the elements; and
    replacing the element with transparency and the overlapped element with the polygons.

12. The method as recited in claim 11, further comprising:
    assigning fill colors to the polygons that approximate the overlapping portion and the non-overlapping portions of the elements.

13. The method as recited in claim 1, wherein the output device is a legacy device that is not capable of printing the complex element.

14. One or more computer-readable memories containing instructions that are executable by a processor to perform the method recited in claim 1.

15. A system comprising:
    an output device configured to print a file; and
    a converter module configured to identify a complex element in the file, the complex element not being printable by the output device, the converter module further configured to determine simpler elements that approximate the complex element and to convert the complex element in the file to the simpler elements.

16. The system as recited in claim 15, wherein the converter module is configured as a filter pipeline with multiple filters connected in series.

17. The system as recited in claim 15, wherein the complex element includes a complex outline and wherein the converter module includes a filter configured to convert the complex element to simple primitives that can be printed by an output device.

18. The system as recited in claim 17, wherein the simple primitives include at least one of a line, a polygon, an area, or a vector shape element.

19. The system as recited in claim 15, wherein the complex element includes a gradient and wherein the converter module includes a filter configured to convert the gradient into multiple polygons with fill colors that approximate the gradient.

20. The system as recited in claim 19, wherein the fill color for each polygon approximates the color of the complex element at the location corresponding to the polygon.

21. The system as recited in claim 19, wherein the gradient changes colors in at least two directions.

22. The system as recited in claim 15, wherein the complex element includes an element with transparency overlapping a region of another element and wherein the converter modules includes a filter configured to convert the transparency element and the overlapped element into new elements without the transparency.

23. The system as recited in claim 22, wherein the complex element includes at least one of a vector shape element and an image element.

24. The system as recited in claim 15, wherein the new elements include elements that represent the transparency element and the overlapping element without the overlapped region.

25. The system as recited in claim 15, wherein the new elements include an element that represents the overlapped region.

26. The system as recited in claim 15, wherein the converter module is further configured to convert the file to page description language (PDL) command streams.

27. The system as recited in claim 15, wherein the output device is a legacy printer that is not capable of printing the complex element.

28. One or more computer-readable media having stored thereon a computer program that, when executed by one or more processors, causes the one or more processors to:
   receive a request to print a file on an output device;
   determine complex elements in the file that are not printable by the output device printer;
   determine simpler elements that approximate the complex elements, the simpler elements being printable by the output device;
   convert the complex element in the file to the simpler elements; and
   send the file with the simpler elements to the output device for printing.

29. One or more computer-readable media as recited in claim 28, wherein the computer program further causes the one or more processors to:
   determine an element with complex outline in the file; and
   convert the element to simple primitives that can be printed by an output device.

30. One or more computer-readable media as recited in claim 28, wherein the computer program further causes the one or more processors to:
   determine an element with a gradient in the file; and
   convert the gradient into multiple polygons with fill colors that approximate the gradient.

31. One or more computer-readable media as recited in claim 28, wherein the computer program further causes the one or more processors to:
   determine a transparency element in the file; and
   convert the transparency element and an element overlapped by the transparency element into new elements without transparency.

32. One or more computer-readable media as recited in claim 28, wherein the output device is a legacy printer that is not capable of printing the complex elements.

33. An apparatus comprising:
   means for identifying a complex element in the file that are not printable by an output device;
   means for determining simpler elements that approximate the complex element; and
   means for converting the complex element in the file to the simpler elements.

34. The apparatus as recited in claim 33, further comprising:
   means for identifying an element with a fill area and a complex outline in the file;
   means for determining a first primitive that approximates the fill area;
   means for determining a second primitive that approximate the complex outline; and
   means for replacing the identified element with the primitives.

35. The apparatus as recited in claim 33, further comprising:
   means for identifying an element with a gradient in the file;
   means for determining polygons that approximate the shape of the element; and
   means for replacing the identified element with the polygons.

36. The apparatus as recited in claim 33, further comprising:
   means for identifying an element with transparency in the file;
   means for identifying another element overlapped by the element with transparency;
   means for determining polygons that approximate the shape of a non-overlapping portion of the elements;
   means for determining polygons that approximate the shape of an overlapping portion of the elements; and
   means for replacing the element with transparency and the overlapped element with the polygons.

* * * * *